United States Patent
Mohamadi (10) Patent No.: US 7,522,641 B2
(45) Date of Patent: Apr. 21, 2009

(54) TEN GIGABIT COPPER PHYSICAL LAYER SYSTEM

(76) Inventor: Farrokh Mohamadi, 8 Halley, Irvine, CA (US) 92612-3797

( * ) Notice: Subject to any disclaimer, the term of this patent is extended or adjusted under 35 U.S.C. 154(b) by 503 days.

(21) Appl. No.: 11/078,130

(22) Filed: Mar. 10, 2005

(65) Prior Publication Data

US 2005/0169319 A1 Aug. 4, 2005

Related U.S. Application Data

(63) Continuation-in-part of application No. 10/423,160, filed on Apr. 25, 2003, now Pat. No. 6,870,503.

(60) Provisional application No. 60/552,219, filed on Mar. 10, 2004.

(51) Int. Cl.
*H04J 3/16* (2006.01)

(52) U.S. Cl. .................. 370/514; 370/350; 370/504; 370/512; 370/541; 370/543; 370/465; 370/282

(58) Field of Classification Search .................. 370/541, 370/645, 543, 350, 282, 542, 514, 503, 465
See application file for complete search history.

(56) References Cited

U.S. PATENT DOCUMENTS

| | | |
|---|---|---|
| 4,346,473 A | 8/1982 | Davis |
| 5,263,033 A | 11/1993 | Seshadri |
| 5,996,104 A | 11/1999 | Herzberg |
| 6,158,041 A | 12/2000 | Raleigh et al. |
| 6,233,712 B1 | 5/2001 | Rhee et al. |
| 6,269,129 B1 | 7/2001 | Rhee et al. |
| 6,396,329 B1 | 5/2002 | Zerbe |
| 6,535,510 B2 | 3/2003 | Kalkunte et al. |
| 6,567,417 B2 | 5/2003 | Kalkunte et al. |

(Continued)

OTHER PUBLICATIONS

IEEE 802 10GBASE IEEE 802 10GBASE-T Tutorial, Albuquerque, NM http://www.ieee802.org/3/10GBT/public/nov03/10GBASE-T_tutorial.pdf Nov. 10, 2003.

(Continued)

*Primary Examiner*—Ricky Ngo
*Assistant Examiner*—Kibrom T Hailu
(74) *Attorney, Agent, or Firm*—Haynes & Boone, LLP.

(57) ABSTRACT

In one embodiment, a 10 Giga-bit Ethernet conversion system is provided that is operable to be inserted in 10 Gigabit optical fiber Ethernet systems, wherein each optical fiber Ethernet system includes an electrical-to-optical interface presenting electrical signals to an optical interface for converting the electrical signals to optical signals, the electrical signals being organized into a plurality of channels, wherein each channel carries Ethernet idle characters between data frame transmissions. The system includes: a transmission alignment circuit operable to detect a unique synchronization code (SC) in the idle character transmissions in the channels, the transmission alignment circuit operable to delay each channel by a variable delay period determined by the period between detection of the SC in the channel and the detection of the last SC in the remaining channels such that the channel having the last SC is not delayed with respect to the other channels, the transmission alignment circuit thereby forming a plurality of aligned channels; and an encoder for modulating each aligned channel into an electrical multiple-bit-per-baud signal, the encoder thereby providing a plurality of multiple-bit-per-baud signals corresponding one a one-to-one basis with the aligned channels.

7 Claims, 9 Drawing Sheets

U.S. PATENT DOCUMENTS

| | | | |
|---|---|---|---|
| 6,570,406 B2 | 5/2003 | Tang et al. | |
| 6,614,372 B1 | 9/2003 | Shi et al. | |
| 6,614,851 B1 | 9/2003 | Dehghan et al. | |
| 6,647,071 B2 | 11/2003 | Sommer et al. | |
| 6,650,140 B2 | 11/2003 | Lee et al. | |
| 6,650,638 B1 | 11/2003 | Walker et al. | |
| 6,654,383 B2 | 11/2003 | Haymes et al. | |
| 6,665,497 B1 | 12/2003 | Hamilton-Gahart et al. | |
| 6,690,894 B2 | 2/2004 | Ho et al. | |
| 6,697,368 B2 | 2/2004 | Chang et al. | |
| 6,704,890 B1 | 3/2004 | Carotti et al. | |
| 6,802,030 B2 * | 10/2004 | Nakano et al. | 714/43 |
| 6,873,630 B1 * | 3/2005 | Muller et al. | 370/356 |
| 6,904,110 B2 * | 6/2005 | Trans et al. | 375/350 |
| 7,111,220 B1 * | 9/2006 | Sasaki et al. | 714/753 |
| 2004/0068593 A1 * | 4/2004 | Helenic et al. | 710/71 |
| 2004/0208180 A1 * | 10/2004 | Light et al. | 370/395.2 |

OTHER PUBLICATIONS

W. Jones, et al, A Survey of commercially available ADC, http://www.ieee802.org/3/10GBT/public/mar03/jones_2_0303.pdf, Mar. 2003.

Joseph N. Babanezhad, 10GBASE 10GBASE-T Line Signaling T Line Signaling, http://www.ieee802.org/3/10GBT/public/mar03/babanezhad_1_0303.pdf.

* cited by examiner

FIG. 10 though referred to as "copper-based," the present invention encompasses the use of conductors that are not copper, such as gold or aluminum.

TEN GIGABIT COPPER PHYSICAL LAYER SYSTEM

RELATED APPLICATION

This application claims the benefit of U.S. Provisional No. 60/552,219, filed Mar. 10, 2004. In addition, this application is a continuation-in-part of U.S. Ser. No. 10/423,160, filed Apr. 25, 2003 now U.S. Pat. No. 6,870,503. The contents of both of these applications are hereby incorporated by reference in their entirety.

TECHNICAL FIELD

The present invention relates generally to data transmission, and more particularly to high speed data transmission.

BACKGROUND

Networks such as local area networks (LANs) require some sort of protocol so that participants on the network can effectively communicate with one another. Although a wide variety of protocols have been developed, the Ethernet protocol is that one that has dominated local area networking. When first developed, Ethernet was restricted to the use of coaxial cables and data rates no higher than 10 Mbps. However, technological progress has advanced the state of the art in Ethernet communication. For example, IEEE 802.3 now defines a version of Ethernet with a nominal data rate of 10 Giga-bit/s. But implementations of 10 Giga-bit/s Ethernet have so far been restricted to systems having optical fiber connections.

Systems having optical fiber connections must include relatively expensive circuitry that converts electronic signals to optical signals and vice versa. If the optical fiber component could be eliminated from 10 Giga-bit/s Ethernet, substantial cost and complexity reductions would be achievable. As a result, much research and development work has focused on a search for a copper-based 10-Giga-bit Ethernet implementation. However, no commercially viable solutions have been found.

Accordingly, there is a need in the art for copper-based 10 Giga-bit/s Ethernet implementations.

SUMMARY

In accordance with one aspect of the invention, a 10 Gigabit Ethernet conversion system is provided that is operable to be inserted in 10 Gigabit optical fiber Ethernet systems, wherein each optical fiber Ethernet system includes an electrical-to-optical interface presenting electrical signals to an optical interface for converting the electrical signals to optical signals, the electrical signals being organized into a plurality of channels, wherein each channel carries Ethernet idle characters between data frame transmissions. The system includes: a transmission alignment circuit operable to detect a unique synchronization code (SC) in the idle character transmissions in the channels, the transmission alignment circuit operable to delay each channel by a variable delay period determined by the period between detection of the SC in the channel and the detection of the last SC in the remaining channels such that the channel having the last SC is not delayed with respect to the other channels, the transmission alignment circuit thereby forming a plurality of aligned channels; and an encoder for modulating each aligned channel into an electrical multiple-bit-per-baud signal, the encoder thereby providing a plurality of multiple-bit-per-baud signals corresponding one a one-to-one basis with the aligned channels.

The invention will be more fully understood upon consideration of the following detailed description, taken together with the accompanying drawings.

DETAILED DESCRIPTION

The present invention provides a copper-based solution for 10 Gigabit/second Ethernet systems. As known in the arts, such a solution is denoted as "copper-based" merely to denote the fact that no optical fiber connections are necessary. Although referred to as "copper-based," the present invention encompasses the use of conductors that are not copper, such as gold or aluminum.

Figure 1:
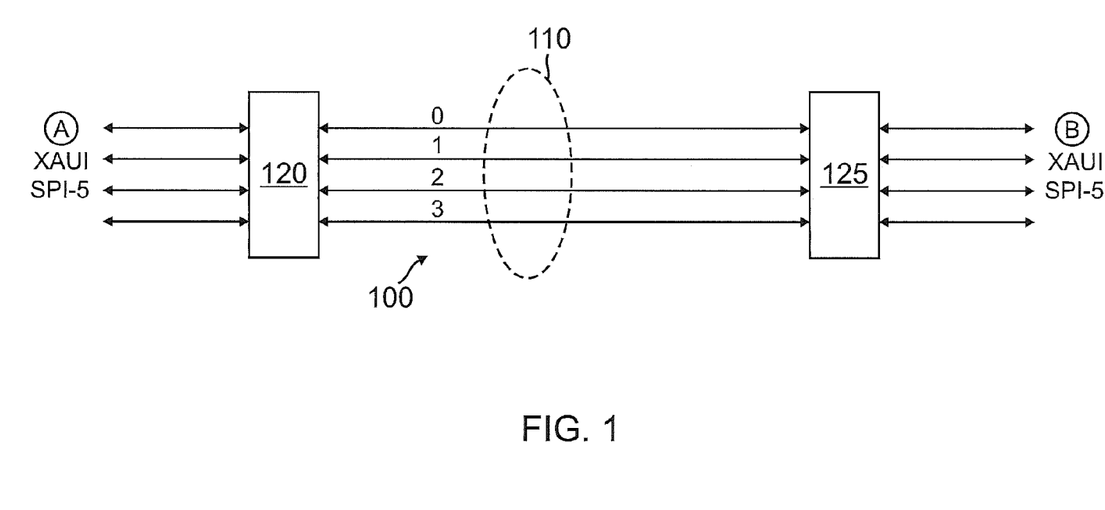
FIG. 1 is a block diagram of a 10 Giga-bit Ethernet system in accordance with an embodiment of the invention.

A number of 10 Gigabit/sec Ethernet protocols are known such as XAUI and SPI-5. However, the present invention is independent of the particular protocol being implemented. Turning now to the Figures, a high-level block diagram of an exemplary copper-based 10 Gigabit system 100 is illustrated in FIG. 1. Using a conventional four pair twisted wire cable such as RJ-45 Ethernet cable 110, system 100 allows 10 Giga-bit communication speeds between points A and B. In conventional 10 Giga-bit Ethernet communication schemes, cable 110 would be replaced by an optical fiber link. To communicate with this optical fiber link, a number of protocols have been developed such as XAUI, SPI-5, and multi-source agreement (MSA). In conventional systems employing these standards, an interface would exist to convert these electrical systems into optical signals and vice-versa. In the exemplary embodiment, system 100 replaces this optical interface.

Advantageously, a user of system 100 does not need to do any engineering to integrate system 100 into their previous designs. For example, suppose the previous system was XAUI-based. System 100 would receive the XAUI signals at point A and convert them into the inventive format described further herein in conversion module 120. The converted signals would then travel electrically through cable 110 to a similar conversion module 125. This module would then convert the cable-carried signals back into the XAUI protocol. Thus, the inclusion of system 100 into such a XAUI-based network would be transparent in that the XAUI components would not "know" that they are not interfacing with an optical fiber link. Because the present invention merely depends upon the Ethernet transmission of idle characters (as will be explained further herein) rather than the particular protocol being implemented to communicate with an optical conversion module, the signals presented to modules 120 and 125 at points A and B, respectively, may be denoted as "formatted electrical signals" in that these (Ethernet) signals are formatted for presentation to an optical conversion circuit. Examples of such formatted electrical signals include XAUI, SFI-5, and SPI-5 signals. It will be understood that such electrical signals are the signals presented to an optical conversion circuit in conventional 10 Giga-bit Ethernet systems.

The four twisted wire pairs in cable 110 are denoted as tracks 0, 1, 2, and 3. Each twisted wire pair corresponds to a formatted electrical channel. Because cable 110 may extend for many meters, conventional electrical signal formats such as XAUI and SFI-5 would suffer from considerable intersymbol interference (ISI) and other effects due to their relatively high baud rate. Thus, the present invention provides conversion modules 120 and 125 that convert these formatted electrical signals into a signal having a lower baud rate. For example, the formatted electrical signals may be converted using multi-pulse amplitude modulation (M-PAM) into M-PAM signals. It will be appreciated that other types of modulation may be implemented.

Should M-PAM be used to provide the reduced baud rate, modules 120 and 125 are configured to convert the formatted electrical signals into electrical pulse amplitude modulated signals such as 8-PAM or 10-PAM. For example, XAUI signals run at 3.125 Gbps each in four lanes. A total of sixteen XAUI lanes thus provides a total of 40 Giga-bit throughput. Using a multiple PAM (M-PAM) modulation such as 8-PAM or 10-PAM, each XAUI channel may be converted into a M-PAM signal running at 833 Gigabaud such that each baud represents 3 bits. Thus, all 16 XAUI channels may be converted into 16 M-PAM signals corresponding to the four groups of four twisted wire pairs in cable 110. Alternatively, other rates such as 1250 Gigabaud where each baud represents 2 bits may be implemented. Rather than use twisted wire pairs, cable 110 may be constructed from parallel coaxial cables to support the lanes of traffic.

Figure 2:
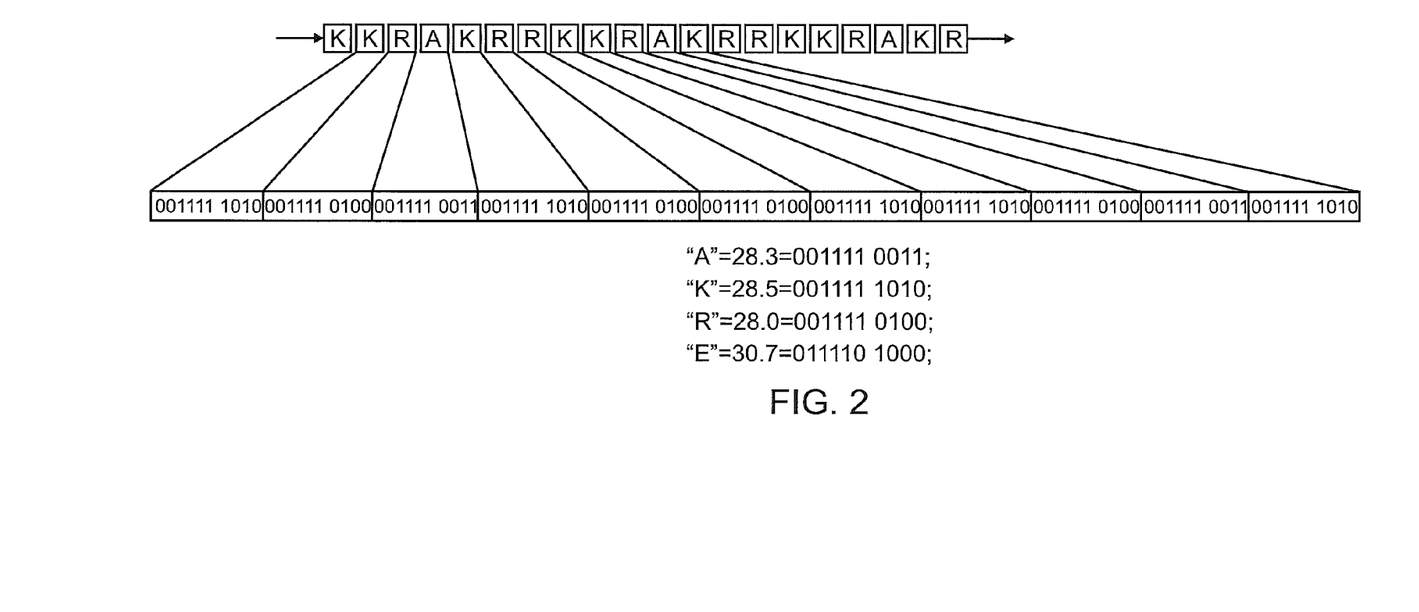
FIG. 2 illustrates an Ethernet interframe transmission sequence.

In the prior art, skew and other problems inhibited effective copper-based 10 Giga-bit solutions. However, the present invention utilizes a unique code sequence that occurs in Ethernet idle character transmissions. As known in the Ethernet arts, when data frames are not being transmitted, the gaps between data transmissions are filled with idle characters such as those illustrated in FIG. 2. These idle characters comprise an 80 cycle (bit) signal including an "A" character equaling 001111 0011; a "K" character equaling 001111 1010, and an "R" character equaling 011110 1000. As shown in FIG. 2, the 80 bit cycle of idle characters repeats as KRRKKRA. In an Ethernet system, the transmission of idle characters rather than data frame transmission is detectable because the interframe transmission will contain a "comma+" character equaling 0011111 that cannot occur during data frame transmission. Should polarities be reversed, a "comma−" character equaling 1100000 will signify that an idle character transmission is occurring.

Modules 120 and 125 receive the multiple-bits-per baud modulated signals (e.g, 8-PAM or 10-PAM) from cable 110 and convert them back into the appropriate formatted electrical signals. Modules 120 and 125 may then synchronize these formatted electrical signals by detecting a unique synchronization code (SC) in the idle character transmissions. For example, a suitable SC code is 000011110011 as a result of the R-A transition in each 80-bit cycle of interframe transmission. For example, in a XAUI-Agnostic system, consider the four XAUI data streams of interframe transmissions provided by the conversion of the M-PAM modulated signals on cable 110. Although cable 110 may be manufactured to carefully match the electrical lengths of the twisted wire pairs, inevitably they cannot be matched perfectly such that the signals will skew as they travel down the respective lanes.

Figure 3:
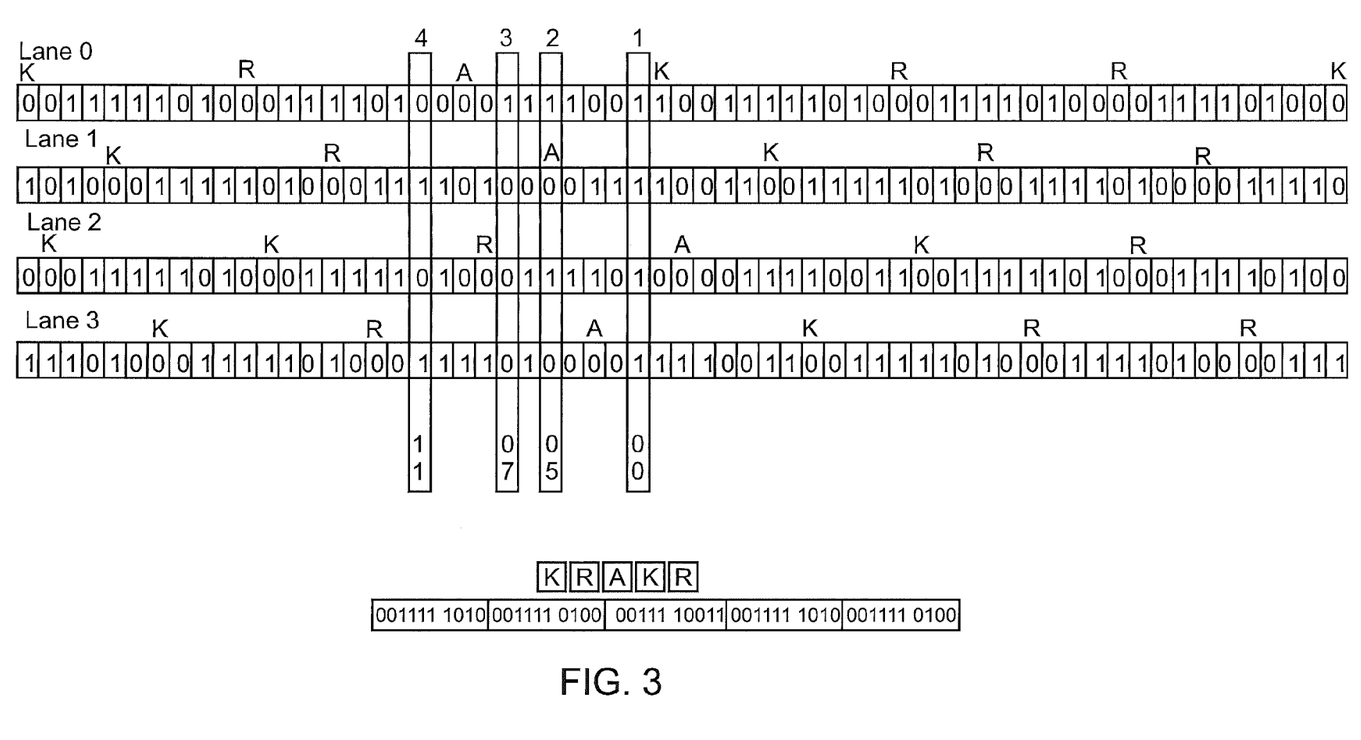
FIG. 3 illustrates the occurrences of the synchronization codes in an interframe transmission sequence subsequent to demodulation of an M-PAM modulated signal in accordance with an embodiment of the invention.

FIG. 3 shows an exemplary amount of skew in the resulting XAUI lanes after demodulation of the M-PAM signals (or other types of multi-bit-per-baud signals) by modules 120 or 125. The end of the SC code in the respective lanes is indicated by the darkening of the last two bits 11. Lane 0 represents the slowest lane as it has the slowest occurrence of the end of the SC code. It may be seen that lane 1 is running five clock cycles ahead of lane 0. Thus, to align these lanes, lane 1 should be delayed by five clock cycles with respect to lane 0. Similarly, lane 3 is running seven clock cycles ahead whereas lane 2 is running 11 clock cycles ahead. Thus, to align these lanes with lane 0, lane 3 should be delayed by seven clock cycles and lane 2 delayed by eleven clock cycles.

It may thus be appreciated that each lane requires a variable buffer in a last lane-based decision making scheme to accommodate the unpredictable amount of delay that a given channel may require. The variable amount of delay is determined by the lane having the last occurrence of the SC. For a given lane, the amount of delay it will need is determined by the clock cycles between when the SC is detected in this lane and when the SC is detected in the lane having the last occurrence. Should a lane be the last lane such as shown for lane 0 in FIG. 3, the corresponding variable buffer size for this lane would be zero since no delay is then desirable for this lane of data traffic. However, the buffer size would be non-zero for the remaining lanes such as a buffer size of eleven for lane 2.

Figure 4:
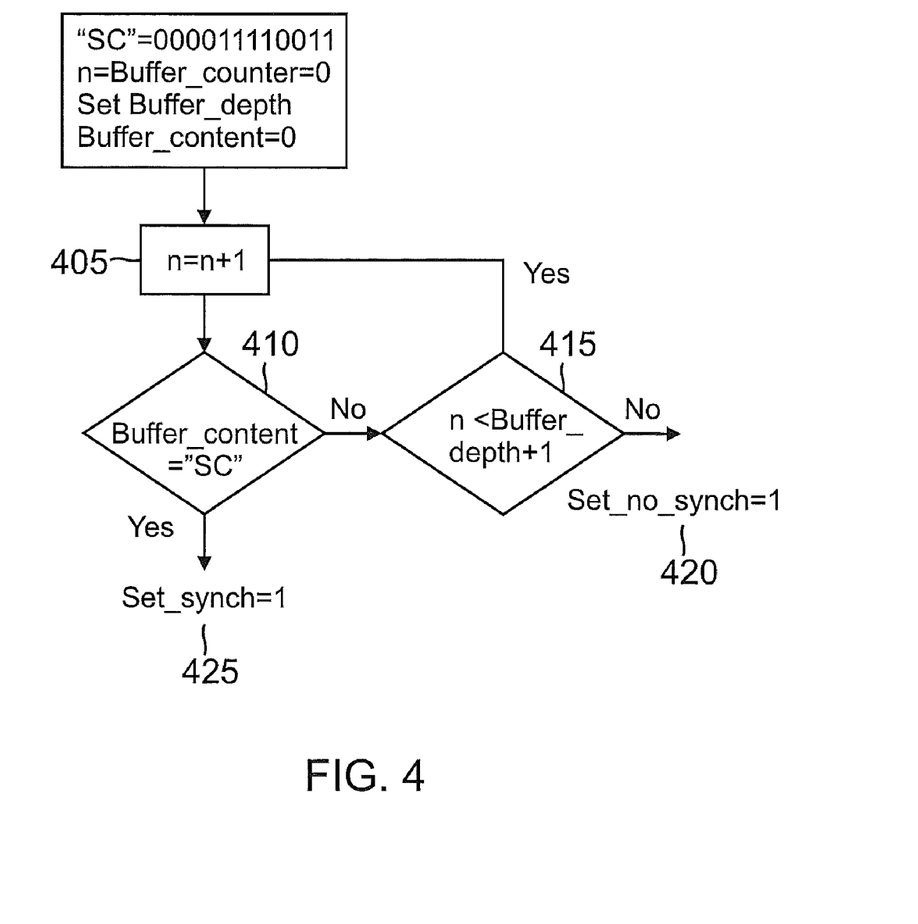
FIG. 4 illustrates a state machine for determining the variable buffer size for a given transmission lane in accordance with an embodiment of the invention.

To determine this variable buffer size, a simple state machine to detect the occurrence of the synchronization code is illustrated in FIG. 4. At step 400, a buffer counter variable n is initialized to zero, the buffer content is initialized to zero, and a buffer depth variable buffer_depth set to a maximum expected value. For example, buffer_depth may be set at 80 because the length of the idle character cycle KRRKKRA is 80 bits long. Step 400 would be initiated for a given lane when the SC code has been detected in that lane. At step 405, the buffer counter is incremented by one. This buffer counter represents the length of the variable delay period. At step 410, whether the last occurrence of SC in the lanes has occurred is determined. If the last occurrence of SC has not yet been detected in step 410, whether the buffer counter is less than buffer_depth+1 is tested in step 415. If the buffer counter is less than this value, the state flow continues at step 405. Otherwise, an error is detected and a no synchronization flag asserted at step 420. If the last occurrence of SC has been detected at step 410, the state flow ends by setting a positive synchronization flag at step 425.

Specific embodiments for various electrical-optical interface signal protocols will now be considered. For example, as discussed above, one such protocol is XAUI-Agnostic. In one embodiment, each conversion module 120 and 125 in FIG. 1 would be configured to convert XAUI-Agnostic signals to M-PAM signals using a XAUI-Agnostic-to-M-PAM conversion sub-module. Similarly, each conversion module would be configured to convert M-PAM signals back into XAUI-Agnostic signals using an M-PAM-to-XAUI-Agnostic conversion sub-module. Thus, each conversion module would include both conversion sub-modules.

Figure 5:
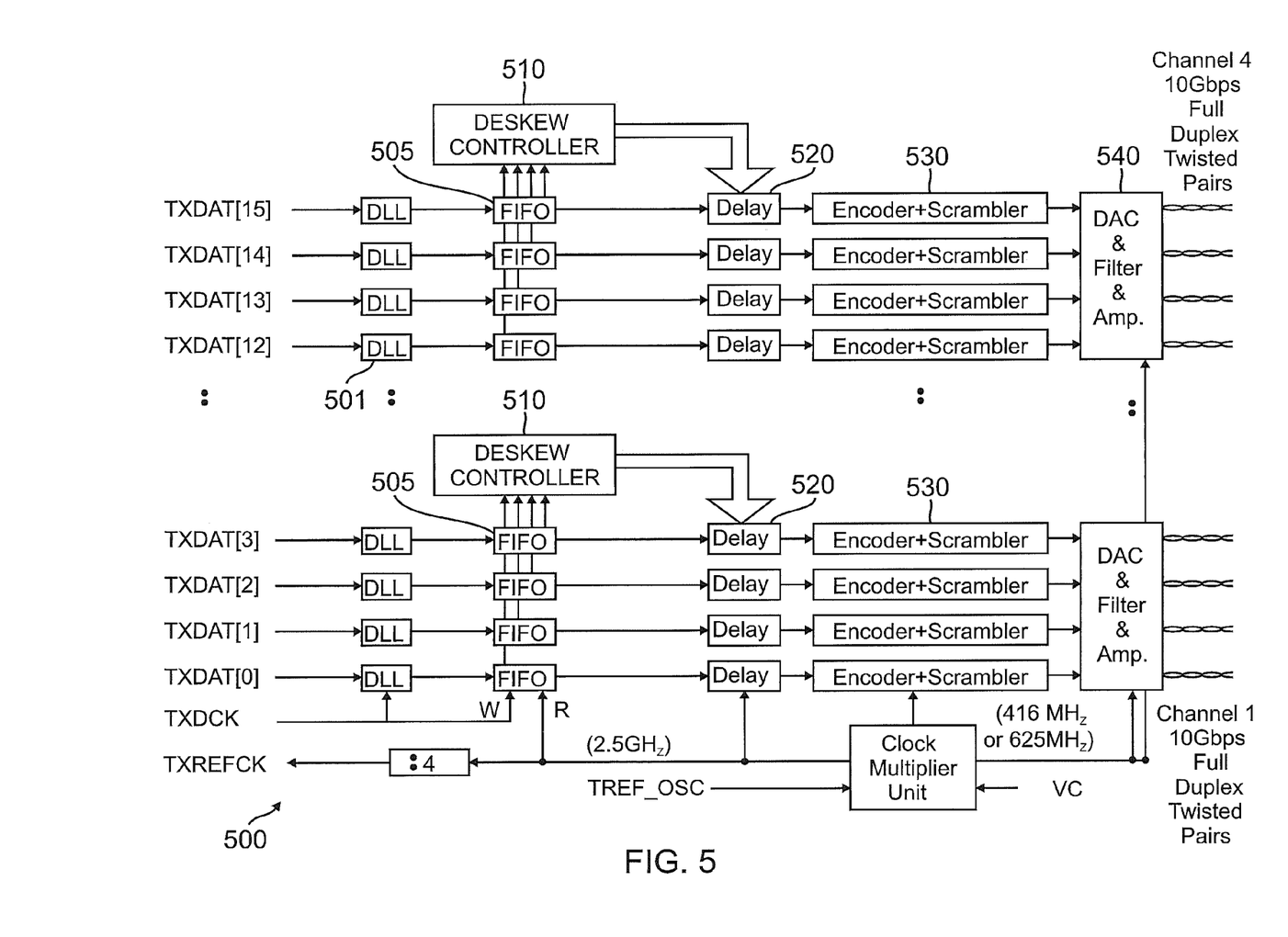
FIG. 5 is block diagram of a XAUI-to-M-PAM conversion sub-module in accordance with an embodiment of the invention.

A block diagram for an exemplary XAUI-Agnostic-to-M-PAM conversion sub-module 500 is illustrated in FIG. 5. The 16 XAUI channels are denoted as TXDAT[0] through TXDAT[15]. To implement the real-time channel alignment discussed herein, sub-module 500 includes a delay locked loop (DLL) 501 for each XAUI channel to sharpen the edge transitions within each channel. Within each channel, DLL 501 provides an output to a FIFO 505. FIFOs 505 provide an output to a deskew controller 510 to signify when the synchronization code has been detected in idle character transmissions. In each channel, DLL 501 also provides its output to a delay line 510. In one embodiment, delay lines 510 may be constructed from flip-flops. The combination of FIFO 505, controller 510, and delay line 520 in each channel implements the last lane decision making state machine discussed with respect to FIG. 4. Thus, controller 510 determines which channel(s) has the earliest occurrence of the synchronization code. Controller 510 then commands the corresponding delay line to begin delaying this channel's signal. At each successive clock cycle, controller 510 determines if another channel(s) has detected the SC code. These channels are also delayed. Finally, after the detection of the last occurrence of the SC code and the application of no delay to that channel, the channels are synchronized. To perform the M-PAM encoding, each channel is processed by an encoder and scrambler 530 and converted into digital form, filtered, and amplified in circuit 540. Each XAUI channel thus maps to a M-PAM signal on a twisted wire pair. As discussed previously, additional modulation schemes may be used besides M-PAM.

Figure 6:
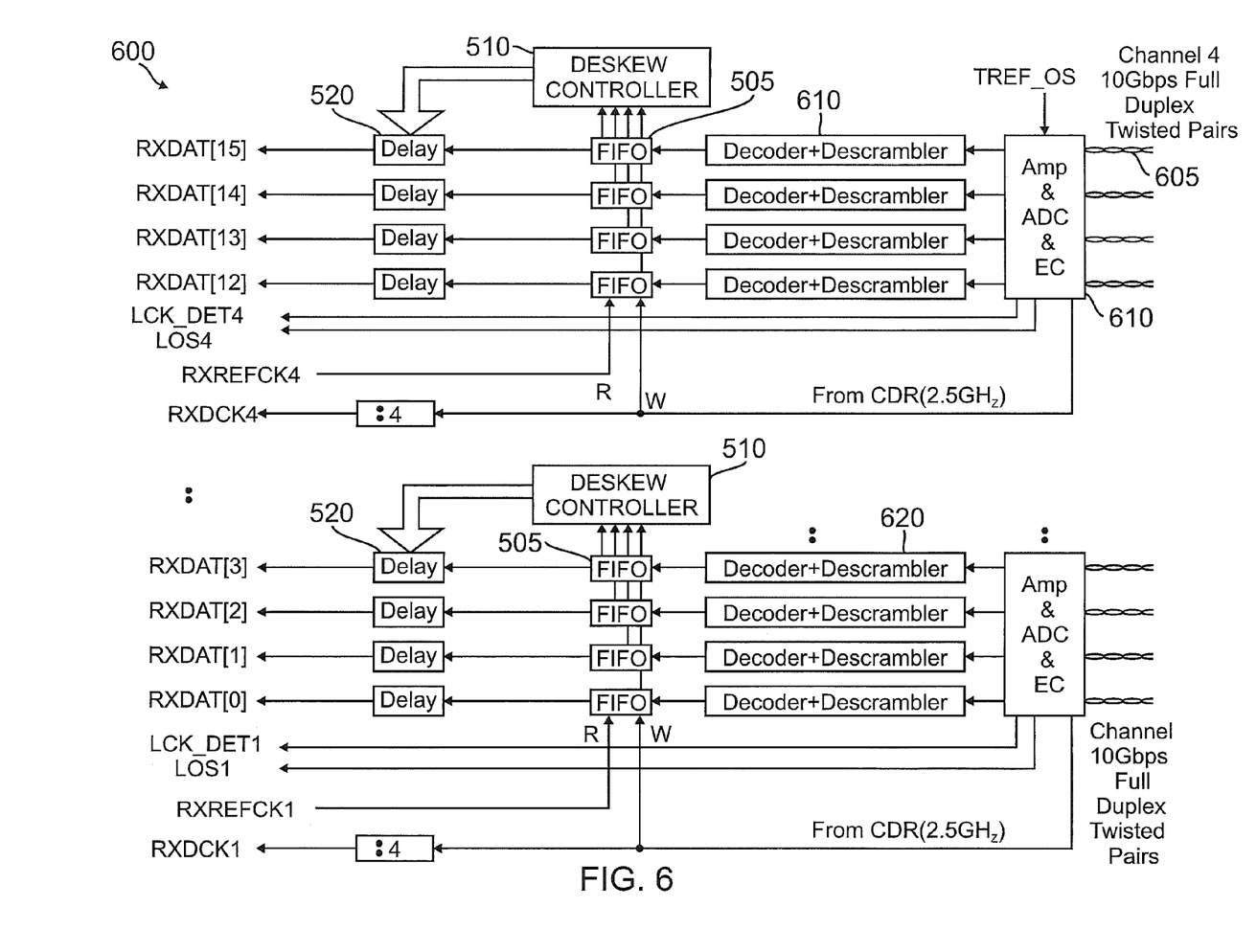
FIG. 6 is a block diagram of an M-PAM-to-XAUI conversion sub-module in accordance with an embodiment of the invention.

As seen in FIG. 6, the construction of an exemplary M-PAM-to-XAUI conversion sub-module 600 is analogous to that already discussed with regard to sub-module 500. In this case, however, the XAUI channels are represented by signals RXDAT[0] through RXDAT[15]. The M-PAM signals on each twisted-wire pair 605 are converted into analog form, amplified, and compensated in circuit 610. To form the unsynchronized XAUI signals, each channel is processed by a decoder and descrambler 620. The alignment of the channels is then performed by FIFO 505, 510, and delay lines 520 as discussed with regard to FIG. 5. Because the M-PAM modulation allows full duplex communication, the same twisted wire pair for a transmitted signal such as TXDAT[0] may be used to carry the corresponding RXDAT[0]. Alternatively, a separate twisted wire pair may be provided for each transmit and receive signal in a half-duplex embodiment.

Figure 7:
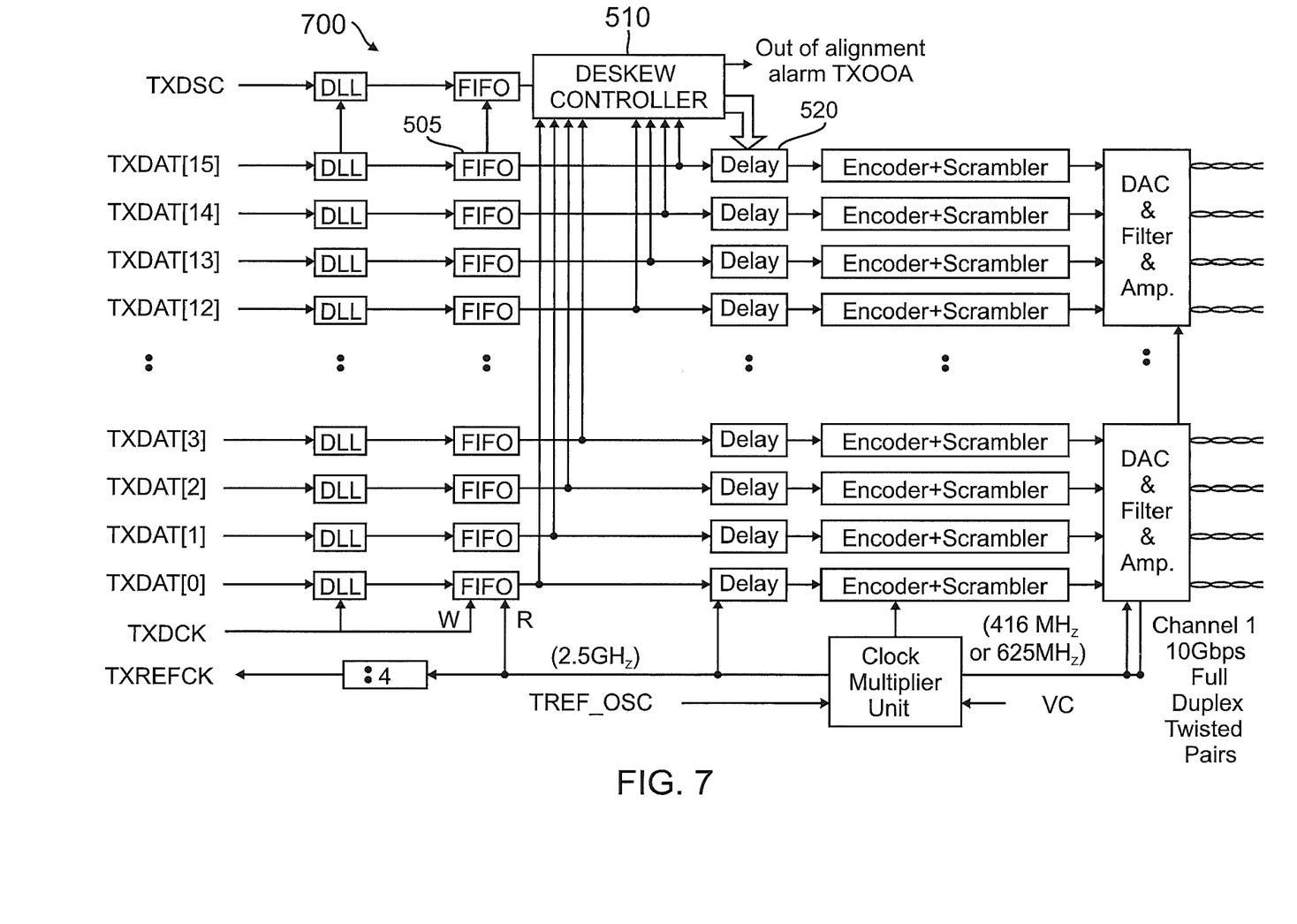
FIG. 7 is block diagram of a SFI-4-to-M-PAM conversion sub-module in accordance with an embodiment of the invention.
Figure 8:
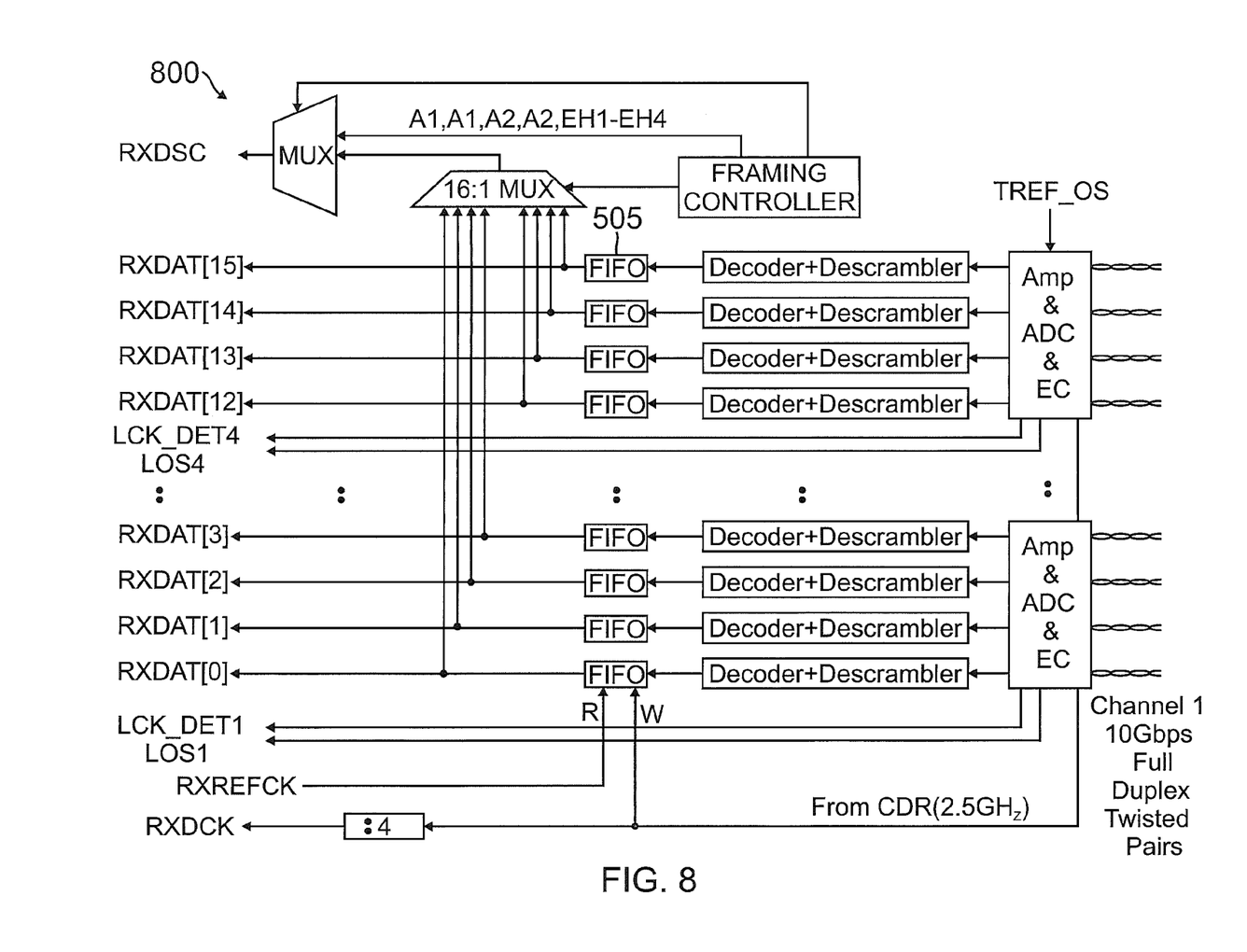
FIG. 8 is a block diagram of an M-PAM-to-SFI-4 conversion sub-module in accordance with an embodiment of the invention.

The same architecture discussed with respect to FIGS. 5 and 6 may be applied to other electrical-optical interface protocols such as SFI-4. In such an embodiment, the encoder and decoder would be altered to process SFI-4 rather than XAUI signals. An exemplary SFI-4-to-M-PAM conversion sub-module 700 is illustrated in FIG. 7. Just as with XAUI, there are 16 channels of transmission data in SFI-5, denoted as TXDAT[0] through TXDAT[15]. Each channel may be aligned using FIFOs 505, controller 510, and variable delay line 520 as discussed with respect to FIG. 5. However, because SFI-5 is not an embedded clock protocol, controller 510 may also receive the TXDSC signal through an additional DLL and FIFO stage. The conversion of M-PAM signals into SFI-5 signals in conversion sub-module 800 shown in FIG. 8 is also performed analogously as discussed with respect to FIG. 7. For illustration clarity, the delay lines and deskew controller are not illustrated in FIG. 8.

Figure 9:
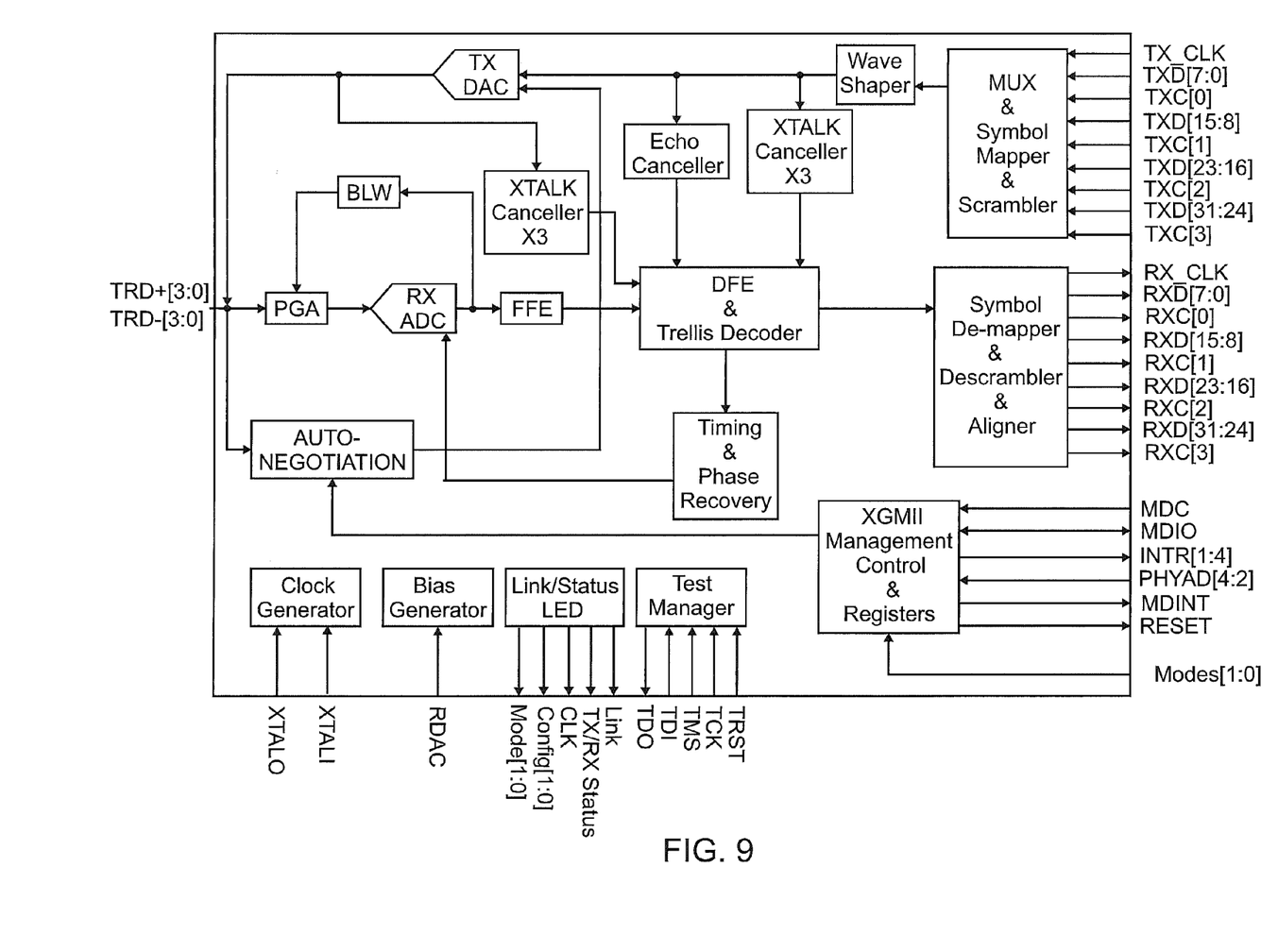
FIG. 9 is a block diagram of an M-PAM-to-XGMII conversion module in accordance with an embodiment of the invention.

Another protocol alternative to XAUI is XGMII. Turning now to FIG. 9, an architecture for an M-PAM to XGMII interface module is illustrated. Four twisted pair of Category 5 or 6 or higher are received at the input, TRD+[3:0]/TRD−[3:0]. The received and transmit signals are in M-PAM form. An autonegotiation function addresses the data rate and backward compatibility to 1 Gbps, 100 Mbps, and 10 Mbps.

The received signal is then amplified and quantized using an analog-to-digital converter (ADC). The quantization level depends on the architecture of the decision feedback equalizer (DFE) and coding/decoding (such as Trellis). The DFE function is optimized for a balance of power consumption and silicon real estate (chip size). The higher the resolution of the ADC, the higher will be the power consumption and design complexity. However, more digital information will be available for digital signal processing (DSP). The benefit will be the degree of freedom in DSP function for accurate cancellation of crosstalk. Introduction of feed-forward equalizer (FFE) before the DFE and after the ADC, enables more robust design of the equalization function and reduces the complexity of the DFE.

The equalized signal is then used to recover the binary data accurately that is synchronized to a local clock oscillator. The recovered data from the clock-data-recovery block is then fed to a symbol de-mapper that adjusts for the speed change and gear-down the baud rate to the bit rate. The data is then presented in 32 pin (RXD) of lower rate data complying to the XGMII data rate.

The transmit signals are collected from the 32 pin TXD and packed and symbolized to a high baud rate. The digital data then is pre-emphasized to address the deficiency of the twisted pair line that causes echo. Furthermore the symbols and pre-emphasis information are used for cross-talk cancellation using the DFE block. The pre-emphasized symbols are then used to be converted to an analog signal using a digital-to-analog converter (DAC). The output of the DAC is then transmitted in full duplex mode using a hybrid transformer with magnetic core. In this fashion, the four twisted wire pairs now carry a total aggregate equivalent of 10 Gbps.

Figure 10:
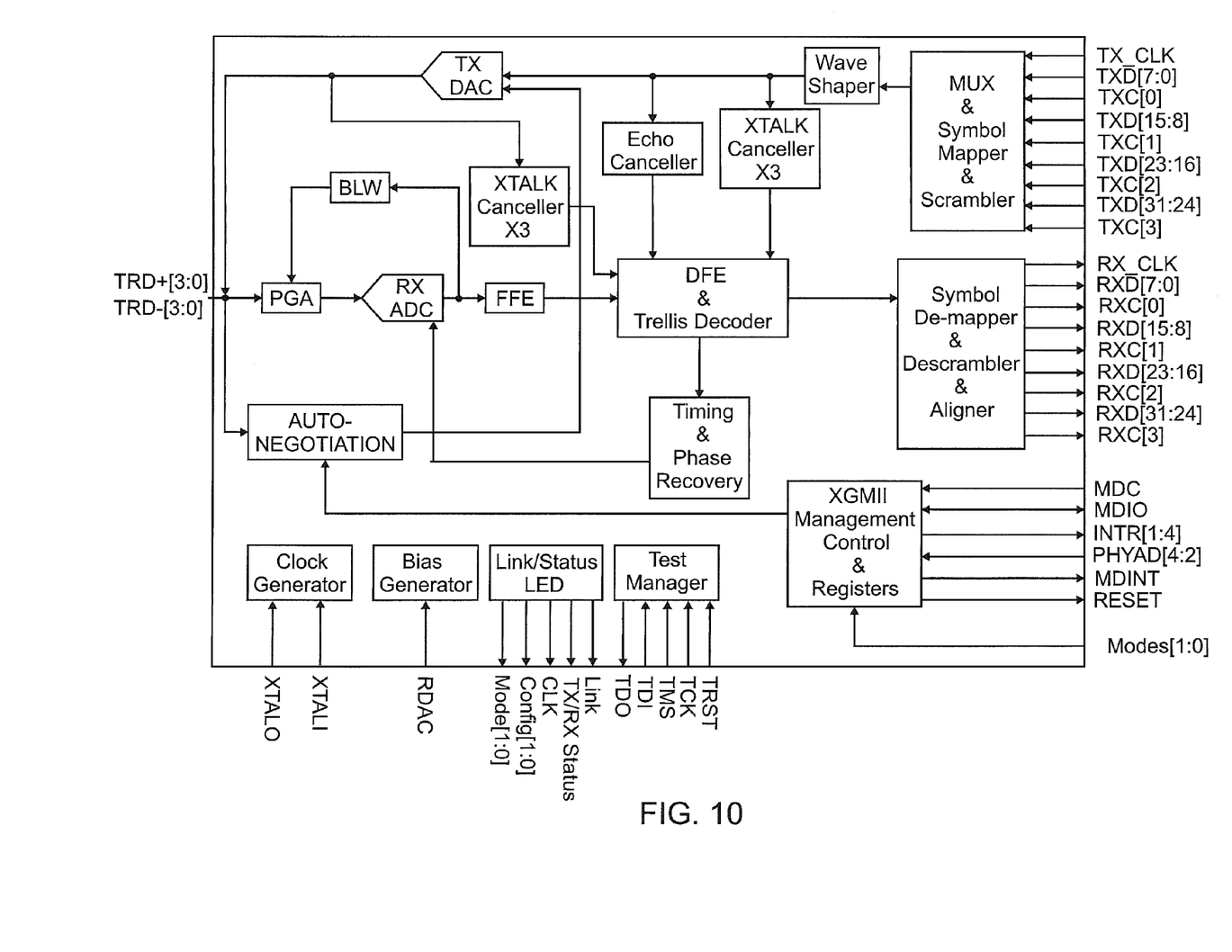
FIG. 10 is a block diagram of an M-PAM-to-XAUI conversion module in accordance with an embodiment of the invention.

A more specific architecture for an M-PAM to XAUI conversion module is illustrated in FIG. 10. Operation of the chip is similar to the M-PAM-to-XGMII conversion module, however, the mapping and alignment is four port rather than 32 ports. This simpler architecture has an important role for seamless connectivity between the existing XAUI based switch line cards and optical interconnects. Using the proposed chip in FIG. 8 allows the optical module completely be replaced with a lower cost category 5 or 6 twisted pair wires.

The received data's edge at the XAUI interface (TD) are sensed and used to recover the data and phase adjusted to a local clock oscillator. The synchronized four lanes of signals are aligned using the scheme that is proposed in this invention. The aligned data at the lanes are then mapped to the symbols that will form the M-PAM output identically as was addressed in M-PAM to XGMII chip. Similarly, the received M-PAM signal from the 4 pair of twisted pairs (TRD) are converted from the M-PAM to symbols that address baud-rate. The symbols are then de-mapped to the four lane of XAUI and pre-emphasized to compensate for the inter-symbol interference (ISI).

The above-described embodiments of the present invention are merely meant to be illustrative and not limiting. It will thus be obvious to those skilled in the art that various changes and modifications may be made without departing from this invention in its broader aspects. The appended claims encompass all such changes and modifications as fall within the true spirit and scope of this invention.

I claim:

1. A 10 Giga-bit Ethernet conversion system operable to be inserted in 10 Gigabit optical fiber Ethernet systems, wherein each optical fiber Ethernet system includes an electrical-to-optical interface presenting electrical signals to an optical interface for converting the electrical signals to optical signals, the electrical signals from the electrical-to-optical interface being organized into a plurality of channels, and wherein each channel carries Ethernet idle characters between data frame transmissions, the system comprising:

a transmission alignment circuit operable to detect a unique synchronization code (SC) in the idle character transmissions in the channels, the transmission alignment circuit operable to delay each channel by a variable delay period determined by the period between detection of the SC in the channel and the detection of the last SC in the remaining channels such that the channel having the last SC is not delayed with respect to the other channels, the transmission alignment circuit thereby forming a plurality of aligned channels;

an encoder for modulating each aligned channel into an electrical multiple-bit-per-baud signal, the encoder thereby providing a plurality of multiple-bit-per-baud signals corresponding one a one-to-one basis with the aligned channels; and a cable having a plurality of twisted-wire pairs corresponding on a one-to-one basis with the plurality of aligned channels, wherein the encoder is configured to drive the multiple-bit-per-baud signals onto the corresponding twisted wire pairs.

2. The 10 Giga-bit Ethernet conversion system of claim 1, wherein the transmission alignment module is configured such that the synchronization code is 000011110011.

3. The 10 Giga-bit Ethernet conversion system of claim 2, wherein the transmission alignment circuit of claim 3 includes a FIFO and a variable delay line for each channel.

4. The 10 Giga-bit Ethernet conversion system of claim 1, wherein the plurality of channels are XAUI-encoded channels.

5. The 10 Giga-bit Ethernet conversion system of claim 1, wherein the plurality of channels are SFI-5-encoded channels.

6. The 10 Giga-bit Ethernet conversion system of claim 1, wherein the encoder is configured to modulate each aligned channel into an M-PAM signal.

7. The 10 Giga-bit Ethernet conversion system of claim 1, further comprising:

a decoder to demodulate the plurality of multiple-bit-per-baud signals on the twisted wire pairs into received channels; and a reception alignment circuit operable to detect the SC in the idle character transmissions in the received channels, the reception alignment circuit operable to delay each received channel by a variable delay period determined by the period between detection of the SC in the received channel and the detection of the last SC in the remaining received channels such that the received channel having the last SC is not delayed with respect to the other received channels, the reception alignment circuit thereby forming a plurality of aligned received channels.

* * * * *